United States Patent
Watkins, Jr. et al.

(10) Patent No.: US 9,828,778 B2
(45) Date of Patent: Nov. 28, 2017

(54) WALKWAY PAD WITH EXPANSION JOINTS

(75) Inventors: Carl E. Watkins, Jr., Anderson, IN (US); Lichih Peng, Fishers, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 1194 days.

(21) Appl. No.: 12/829,723

(22) Filed: Jul. 2, 2010

(65) Prior Publication Data
US 2012/0000152 A1   Jan. 5, 2012

(51) Int. Cl.
| | | |
|---|---|---|
| *E04F 15/14* | (2006.01) | |
| *E04F 15/02* | (2006.01) | |
| *E04D 13/12* | (2006.01) | |
| *E04F 15/10* | (2006.01) | |
| *E04F 15/18* | (2006.01) | |
| *B29C 43/24* | (2006.01) | |

(52) U.S. Cl.
CPC .............. *E04F 15/14* (2013.01); *E04D 13/12* (2013.01); *E04F 15/0215* (2013.01); *E04F 15/02194* (2013.01); *E04F 15/105* (2013.01); *E04F 15/107* (2013.01); *B29C 43/24* (2013.01); *E04F 15/183* (2013.01)

(58) Field of Classification Search
CPC .. E04D 3/358; E04D 5/00; E04D 5/06; E04D 5/08; E04D 5/14; E04D 5/141; E04D 5/142; E04D 5/143; E04D 5/146; E04D 5/148; E04D 5/149; E04D 12/00; E04D 12/002; E04D 13/00; E04D 13/12; E04F 15/14; E04F 15/0215; E04F 15/02194; E04F 15/105; E04F 15/107; E04F 15/183; E01C 5/18; E01C 5/20; E04C 2/00; E04C 2/02; E04C 2/20; E04C 2/50; E04B 1/00; E04B 1/62; E04B 1/66; E04B 1/68; E04B 1/6815; B29C 43/24
USPC ............... 52/177–181, 393, 394, 395, 396.1, 52/396.04, 396.06, 409, 410, 416, 419, 52/420, 480, 58
See application file for complete search history.

(56) References Cited

U.S. PATENT DOCUMENTS

| | | | | |
|---|---|---|---|---|
| 3,307,306 A | * | 3/1967 | Oliver ........................... | 52/409 |
| 3,484,405 A | * | 12/1969 | Seto ............................. | 524/515 |
| 3,581,450 A | * | 6/1971 | Patry .................... | E04B 1/6809 |
| | | | | 52/396.04 |
| 3,643,388 A | * | 2/1972 | Parr ..................... | E04D 13/151 |
| | | | | 52/277 |
| 3,713,263 A | * | 1/1973 | Mullen ................. | E04D 13/151 |
| | | | | 52/396.04 |
| 3,724,155 A | * | 4/1973 | Reeve ................... | E04D 13/151 |
| | | | | 52/396.04 |
| 3,810,707 A | * | 5/1974 | Tungseth et al. ............... | 404/67 |
| 4,601,935 A | * | 7/1986 | Metcalf et al. ................. | 428/57 |
| 4,674,245 A | * | 6/1987 | Turner ........................... | 52/177 |
| 4,680,909 A | * | 7/1987 | Stewart .......................... | 52/409 |
| 4,817,963 A | * | 4/1989 | Munden et al. .............. | 277/316 |
| 4,848,044 A | * | 7/1989 | LaRoche .............. | E04B 1/6804 |
| | | | | 404/68 |
| 5,085,022 A | * | 2/1992 | Paliwoda ..................... | 52/309.8 |

(Continued)

*Primary Examiner* — Theodore Adamos
(74) *Attorney, Agent, or Firm* — Thomas R. Kingsbury; Arthur M. Reginelli

(57) ABSTRACT

A walkway pad is provided for placement on a flat roof to protect the roof from foot traffic, tools, and/or equipment. The walkway pad includes a body and at least one expansion joint that absorbs thermal movement of the body. A method of manufacturing the walkway pad is also provided.

20 Claims, 9 Drawing Sheets

(56) References Cited

U.S. PATENT DOCUMENTS

| | | | | |
|---|---|---|---|---|
| 5,095,068 | A * | 3/1992 | Chiu | 524/525 |
| 5,563,217 | A * | 10/1996 | Davis et al. | 525/194 |
| 5,800,891 | A * | 9/1998 | Wasitis | 428/42.2 |
| 5,859,114 | A * | 1/1999 | Davis et al. | 524/490 |
| 6,071,996 | A * | 6/2000 | Davis et al. | 524/482 |
| 6,491,471 | B1 * | 12/2002 | Susinskas | 404/73 |
| 7,000,360 | B1 | 2/2006 | Russell et al. | |
| 2005/0000179 | A1 * | 1/2005 | Hornsby et al. | 52/409 |
| 2007/0261342 | A1 * | 11/2007 | Cummings | E04D 13/151 52/393 |
| 2010/0119820 | A1 * | 5/2010 | Ultsch | 428/343 |

* cited by examiner

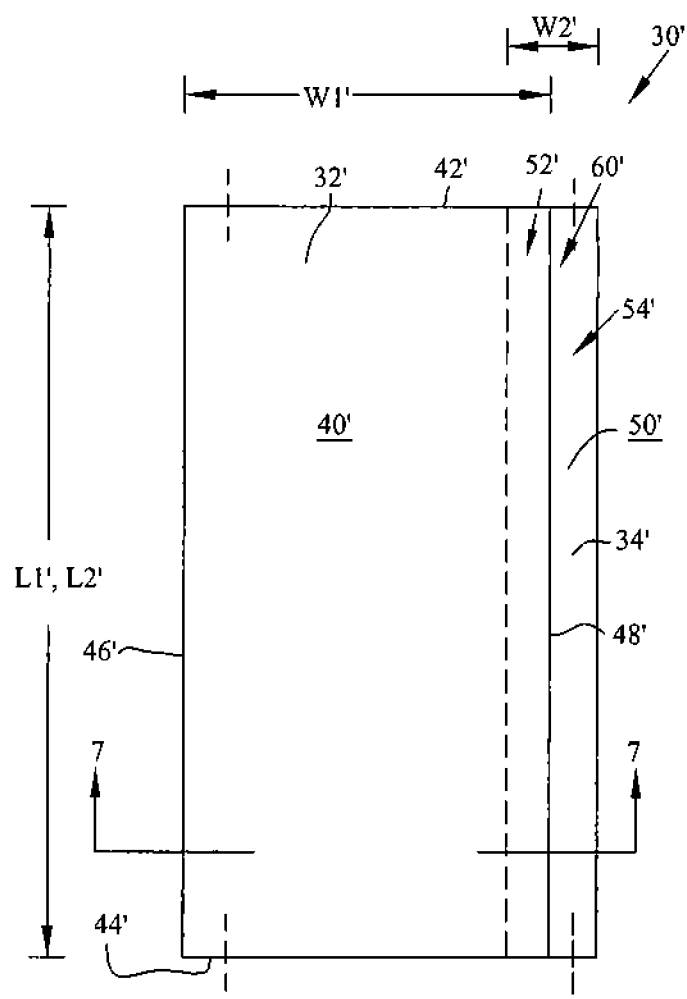
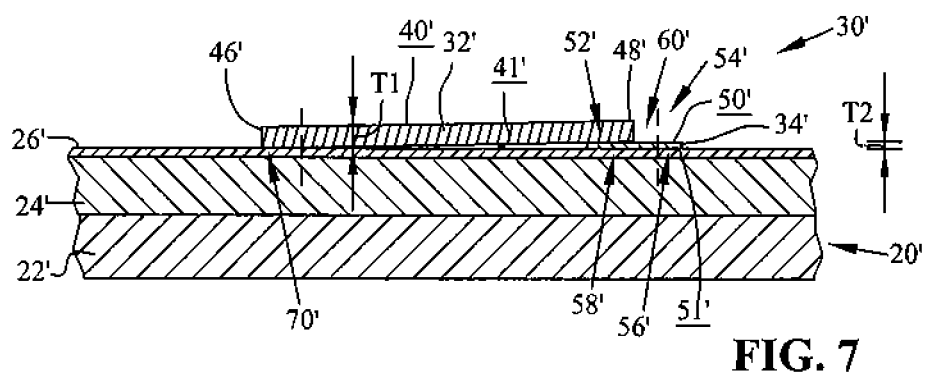
FIG. 6
FIG. 7

WALKWAY PAD WITH EXPANSION JOINTS

BACKGROUND

1. Field of the Invention

The present invention relates to a walkway pad to protect a roof from damage caused by foot traffic, tools, and/or equipment. More particularly, the present invention relates to a walkway pad for placement on a flat or low slope roof to protect the roof from foot traffic, tools, and/or equipment, and to a method of manufacturing the same.

2. Description of the Related Art

The approaches described in this section could be pursued, but are not necessarily approaches that have been previously conceived or pursued. Therefore, unless otherwise indicated herein, the approaches described in this section are not teachings or suggestions of the prior art to the claims in this application and are not admitted to be prior art by inclusion in this section.

Walkway pads are placed on flat or low slope roofs to protect the roofs from foot traffic, tools, and/or equipment. Generally, walkway pads are placed at access points and along common traffic paths, such as along a traffic path to a piece of roof-mounted equipment that is traveled whenever the equipment is serviced or repaired.

Known walkway pads are constructed of rubber that expands and contracts in changing temperatures. As the temperature rises, the walkway pads expand. As the temperature drops, the walkway pads contract. Because the walkway pads are secured to the roof, these thermal movements may cause the walkway pads to buckle, which is both aesthetically displeasing and a potential trip hazard.

Prior attempts to reduce buckling have involved increasing the rigidity of the walkway pad using dimensional fillers. However, these rigid walkway pads are heavy and difficult to store and transport on a roll. Also, these rigid walkway pads are usually not made of recycled materials.

SUMMARY

The present invention provides a walkway pad for placement on a flat roof to protect the roof from foot traffic, tools, and/or equipment. The walkway pad includes a body and at least one expansion joint that absorbs thermal movement of the body. The present invention also provides a method of manufacturing the same.

According to an embodiment of the present invention, a walkway pad is provided for protecting a roof. The walkway pad includes a body and at least one expansion joint coupled to the body. The body includes a top walkway surface, a bottom surface that faces the roof, and an outer periphery. The at least one expansion joint extends outwardly beyond the outer periphery of the body, the at least one expansion joint including an expansion region that is configured to deform to a greater extent than the body when the walkway pad is exposed to a changing temperature.

According to another embodiment of the present invention, a walkway pad is provided for protecting a roof. The walkway pad includes a body and at least one expansion joint. The body includes a top walkway surface and a bottom surface that faces the roof. The at least one expansion joint includes a first attachment region coupled to the body, a second attachment region adapted to couple the walkway pad to the roof, and a third expansion region located between the first and second attachment regions that is free to move relative to the body and the roof to absorb thermal movement of the body.

According to yet another embodiment of the present invention, a method of manufacturing a walkway pad is provided for protecting a roof. The method includes the steps of: providing a body including a top walkway surface, a bottom surface, and an outer periphery; and forming at least one expansion joint that extends beyond the outer periphery of the body, the at least one expansion joint including a first attachment region coupled to the body, a second attachment region adapted to couple the walkway pad to the roof, and a third expansion region located between the first and second attachment regions that is configured to deform to a greater extent than the body when the walkway pad is exposed to a changing temperature.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 6 is a top plan view of the walkway pad of FIG. 5;

FIG. 7 is a cross-sectional view of the walkway pad of FIG. 6 mounted to a flat roof, the cross-sectional view taken along line 7-7 of FIG. 6;

Figure 1:
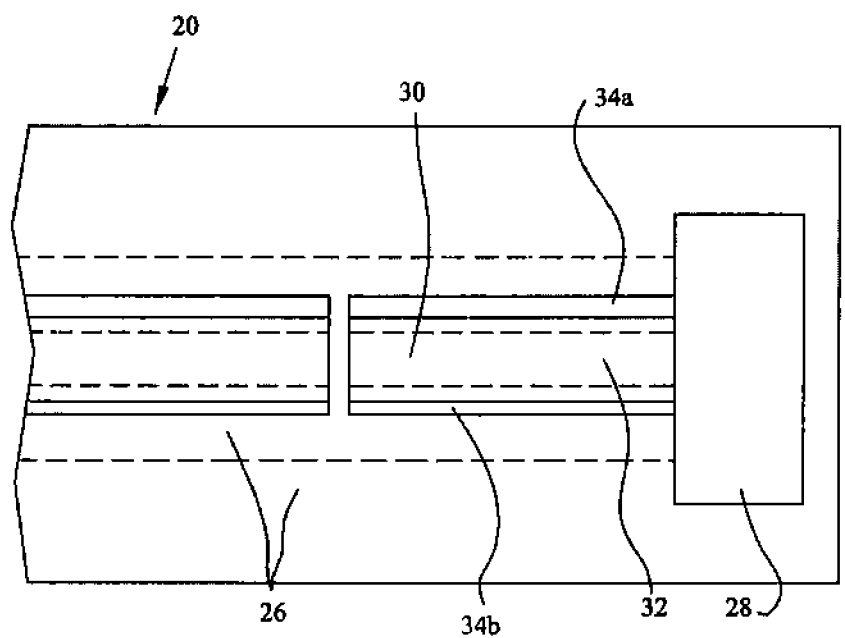
FIG. 1 is a top plan view of an exemplary walkway pad of the present invention mounted to a flat roof.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

FIG. 1 depicts a portion of flat roof 20. Unlike a sloped roof, flat roof 20 is horizontal or nearly horizontal with only a slight inclination. Flat or low sloped roofs, like roof 20, are generally used on commercial buildings and large residential buildings, while high sloped roofs are generally used on homes.

Figure 4:
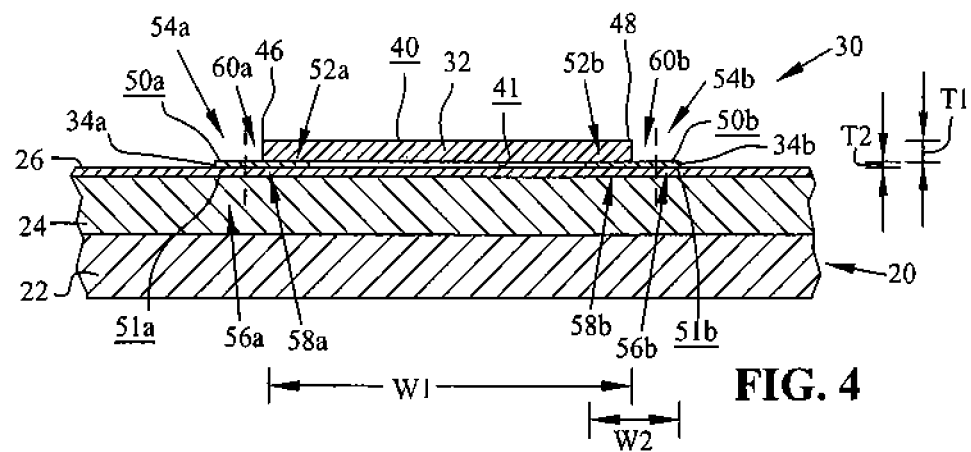
FIG. 4 is a cross-sectional view of the walkway pad of FIG. 3 mounted to the flat roof of FIG. 1, the cross-sectional view taken along line 4-4 of FIG. 3.

Roof 20 is shown in cross-section in FIG. 4. Roof 20 includes a base or deck 22, which may be constructed of metal, wood, concrete, or another suitable material. Atop deck 22, roof 20 includes an intermediate layer of insulation 24. Atop insulation 24, roof 20 includes protective membrane 26 that is designed to shield both deck 22 and insulation 24 of roof 20 from heat and moisture. Adjacent layers of roof 20 may be secured together using suitable mechanical fasteners, adhesives, or welding techniques, for example. The roof construction may vary and is not limited to the particular construction described and illustrated herein.

Membrane 26 of roof 20 may be a continuous sheet of material or, as shown in FIG. 1, membrane 26 may include multiple strips of material bonded together. Membrane 26 may be constructed of reinforced or unreinforced rubbers, such as ethylene-propylene-diene (EPDM) terpolymers, ethylene-propylene copolymers, or other similar olefin-type polymers, and mixtures thereof. An exemplary material that may be used to manufacture membrane 26 is thermoplastic polyolefin (TPO), which includes thermoplastic polymer, rubber, and a reinforcing filler.

As shown in FIG. 1, equipment 28 that services the underlying building (not shown) is mounted atop roof 20. Equipment 28 may be an air conditioning apparatus, an HVAC unit, an exhaust fan, a smoke hatch, a condenser unit, window washing equipment, a lightening protection unit, or another device that services the underlying building, for example.

A plurality of walkway pads 30 have been applied atop roof 20 of FIG. 1. In use, walkway pads 30 protect roof 20, specifically membrane 26 of roof 20, from foot traffic. According to an exemplary embodiment of the present invention, walkway pads 30 are placed at access points and along common traffic paths, such as along a traffic path to equipment 28 that is traveled whenever equipment 28 is serviced or repaired.

Figure 2:
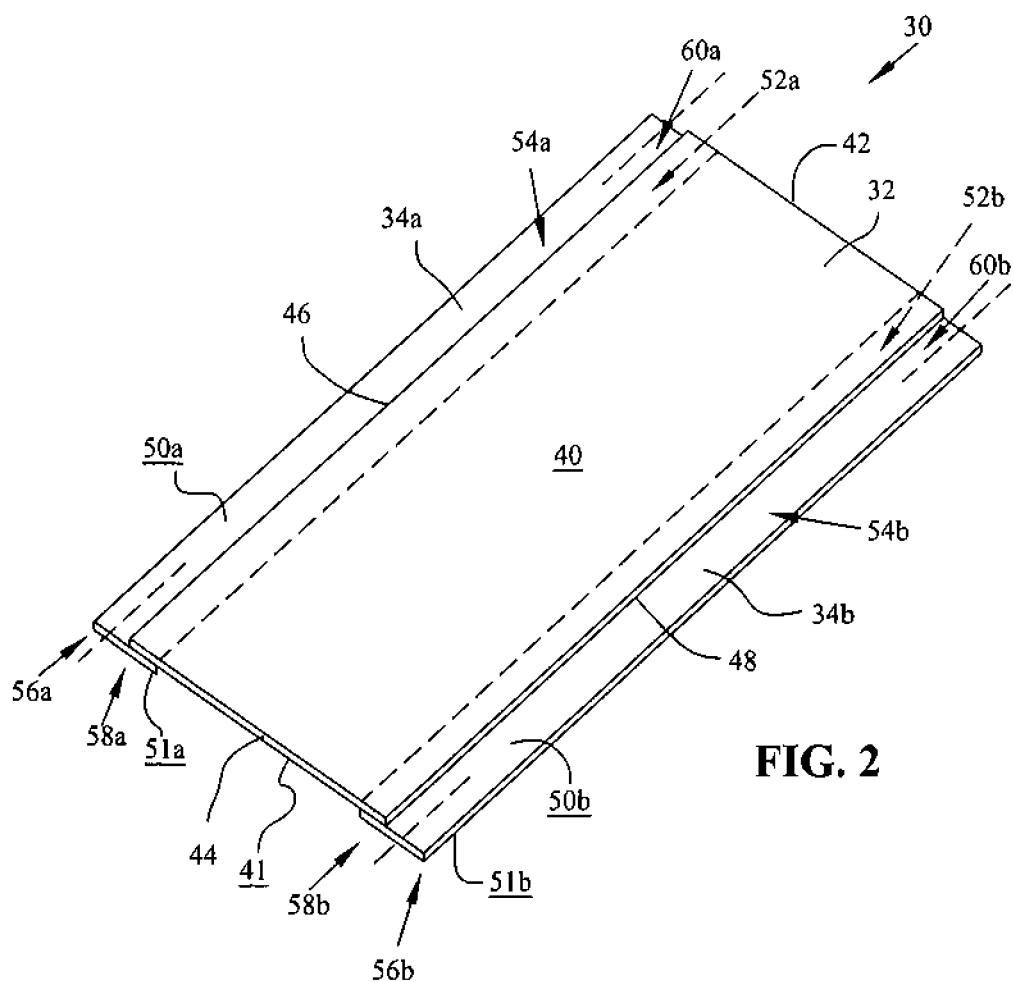
FIG. 2 is a perspective view of the walkway pad of FIG. 1, the walkway pad including a body and two expansion joints.
Figure 3:
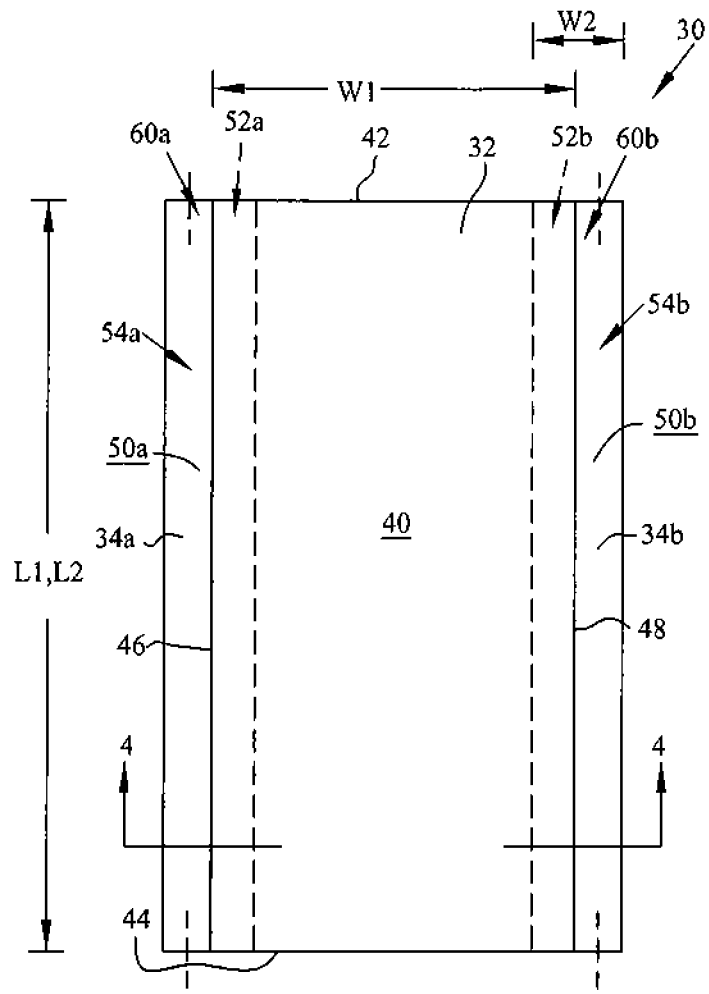
FIG. 3 is a top plan view of the walkway pad of FIG. 2.

An exemplary walkway pad 30 is illustrated in FIGS. 2-4. Walkway pad 30 includes body 32 and expansion joints 34a, 34b, located beneath body 32.

Body 32 of walkway pad 30 includes top surface 40 and an opposing bottom surface 41 that faces both roof 20 and expansion joints 34a, 34b. An outer periphery of body 32 is defined by first end 42, second end 44, first side 46, and second side 48. As shown in FIG. 3, body 32 of walkway pad 30 is generally rectangular in shape having length $L_1$ that extends from first end 42 to second end 44 and width $W_1$ that extends from first side 46 to second side 48. Width $W_1$ may equal approximately 20" (50.8 cm), 30" (76.2 cm), 40" (101.6 cm), or more, for example, with length $L_1$ varying depending upon the particular application. It is also within the scope of the present invention that body 32 of walkway pad 30 may be available in other suitable shapes.

Expansion joints 34a, 34b, of walkway pad 30 include top surfaces 50a, 50b, that face body 32 and opposing bottom surfaces 51a, 51b, that face roof 20. As shown in FIG. 3, each expansion joint 34a, 34b, of walkway pad 30 is an elongate, rectangular strip having length $L_2$ that is substantially equal to length $L_1$ of body 32 and width $W_2$ of approximately 4" (10.2 cm), 6" (15.2 cm), 8" (20.3 cm), 10" (25.4 cm), or more, for example.

As shown in FIG. 2, body 32 partially overlaps expansion joints 34a, 34b. More particularly, first side 46 of body 32 partially overlaps expansion joint 34a and second side 48 of body 32 partially overlaps expansion joint 34b. In this partially overlapping arrangement, each expansion joint 34a, 34b, includes first overlapping region 52a, 52b, where bottom surface 41 of body 32 overlaps top surface 50a, 50b, of expansion joint 34a, 34b, and second free region 54a, 54b, that extends outwardly from body 32 such that bottom surface 41 of body 32 does not overlap top surface 50a, 50b, of expansion joint 34a, 34b. Depending on the total width $W_2$ of each expansion joint 34a, 34b, each overlapping region 52a, 52b, may be approximately 2" (5.1 cm), 3" (7.6 cm), or 4" (10.2 cm) wide, and each free region 54a, 54b, may be approximately 2" (5.1 cm), 3" (7.6 cm), or 4" (10.2 cm) wide, for example.

Referring to FIG. 4, body 32 may be secured to expansion joints 34a, 34b, by welding, adhering, taping, bonding, or otherwise securing bottom surface 41 of body 32 to top surfaces 50a, 50b, of expansion joints 34a, 34b, and more specifically to overlapping regions 52a, 52b, of top surfaces 50a, 50b, of expansion joints 34a, 34b. If body 32 is welded to expansion joints 34a, 34b, the components should be at about the same temperature before welding.

Referring still to FIG. 4, walkway pad 30 may be secured to roof 20 by welding, adhering, taping, bonding, or otherwise securing bottom surfaces 51a, 51b, of expansion joints 34a, 34b, to roof 20, and more specifically to membrane 26 of roof 20. If expansion joints 34a, 34b, of walkway pad 30 are welded to membrane 26 of roof 20, the components should be at about the same temperature before welding. According to an exemplary embodiment of the present invention, only the outer-most portion of each expansion joint 34a, 34b, is secured to roof 20. Therefore, as shown in FIG. 4, each expansion joint 34a, 34b, includes outer attachment region 56a, 56b, where bottom surface 51a, 51b, is secured to membrane 26 of roof 20, and inner free region 58a, 58b, where bottom surface 51a, 51b, is not secured to membrane 26 of roof 20. Depending on the total width $W_2$ of each expansion joint 34a, 34b, each attachment region 56a, 56b, may be approximately 1" (2.5 cm), 1.5" (3.8 cm), or 2" (5.1 cm) wide, for example.

With walkway pad 30 secured to roof 20, a serviceman or another user may walk across top surface 40 of body 32 from first end 42 to second end 44. For example, the user may walk across top surface 40 of body 32 to access and repair equipment 28 (FIG. 1) on top of roof 20. Top surface 40 of body 32 may be textured to provide traction for the user, even in wet conditions. Although bottom surface 41 of body 32 is shown hovering slightly above roof 20, body 32 may bend under the user's weight until bottom surface 41 of body 32 contacts roof 20.

Body 32 expands and contracts with temperature changes. As the temperature rises, body 32 expands. As the temperature drops, body 32 contracts. To reduce or eliminate buckling of body 32, each expansion joint 34a, 34b, includes a corresponding expansion region 60a, 60b, that is designed to deform to a greater extent than body 32 to absorb thermal movement (expansion/contraction) of body 32. As a result, body 32 remains flat against roof 20 to provide a flat walking surface and an aesthetically pleasing appearance.

As shown in FIG. 4, expansion regions 60a, 60b, of expansion joints 34a, 34b, are not directly attached to body 32 or to roof 20. More specifically, expansion regions 60a, 60b, of expansion joints 34a, 34b, are offset from both overlapping regions 52a, 52b, of top surfaces 50a, 50b, and attachment regions 56a, 56b, of bottom surfaces 51a, 51b.

Thus, expansion regions 60a, 60b, of expansion joints 34a, 34b, are defined where free regions 54a, 54b, of top surfaces 50a, 50b, overlap free regions 58a, 58b, of bottom surfaces 51a, 51b. Each expansion region 60a, 60b, may be approximately 1" (2.5 cm), 1.5" (3.8 cm), or 2" (5.1 cm) wide, for example.

Although expansion joints 34a, 34b, are shown extending only along first side 46 and second side 48 of body 32, expansion regions 60a, 60b, of expansion joints 34a, 34b, may deform sufficiently to allow first end 42, second end 44, first side 46, and second side 48 of body 32 to lie flat against roof 20. It is also within the scope of the present invention that walkway pad 30 may include additional expansion joints located beneath first end 42 and/or second end 44 of body 32, for example. However, a gap should be present between adjacent expansion joints to allow air to escape beneath body 32 when the user walks across body 32.

According to an exemplary embodiment of the present invention, the material used to construct expansion joints 34a, 34b, of walkway pad 30 is more flexible and/or resilient than the material used to construct body 32 of walkway pad 30. For example, body 32 of walkway pad 30 may be constructed of a supported thermoplastic polyolefin (TPO), including thermoplastic polymer, rubber, and a reinforcing filler, some or all of which may be recycled materials. An exemplary body 32 includes the UltraPly™ TPO Premium Walkway Pad, available from Firestone Building Products Company of Indianapolis, Ind. If body 32 of walkway pad 30 is constructed of a supported TPO material, expansion joints 34a, 34b, of walkway pad 30 may be constructed of a more flexible material, such as an extruded blend of recycled rubber and thermoplastic polyolefin (RPO) or an unsupported TPO material. In this embodiment, the more flexible expansion regions 60a, 60b, of expansion joints 34a, 34b, are more deformable than body 32 and are able to absorb thermal movement (expansion/contraction) of body 32, thereby reducing or eliminating buckling of body 32.

According to another exemplary embodiment of the present invention, expansion joints 34a, 34b, of walkway pad 30 are thinner than body 32 of walkway pad 30. For example, as shown in FIG. 4, thickness $T_2$ of each expansion joint 34a, 34b, may be approximately 0.03" (0.8 mm), 0.04" (1.0 mm), 0.05" (1.3 mm), 0.06" (1.5 mm), or more, while thickness $T_1$ of body 32 may be as small as approximately 0.06" (1.5 mm), 0.10" (2.5 mm), 0.15" (3.8 mm), 0.20" (5.1 mm), 0.25" (6.4 mm), or 0.30" (7.6 mm) and as large as approximately 0.35" (8.9 mm), 0.40" (10.2 mm), 0.45" (11.4 mm), or 0.50" (12.7 mm). Thus, thickness $T_2$ of each expansion joint 34a, 34b, may be about 10%, 20%, 30%, 40%, or 50% of thickness $T_1$ of body 32. In this embodiment, the thinner expansion regions 60a, 60b, of expansion joints 34a, 34b, are more deformable than the thicker body 32 and are able to absorb thermal movement (expansion/contraction) of body 32, thereby reducing or eliminating buckling of body 32.

According to yet another exemplary embodiment of the present invention, expansion joints 34a, 34b, of walkway pad 30 are dark in color. For example, expansion joints 34a, 34b, may be gray or black in color. In this embodiment, the dark expansion regions 60a, 60b, of expansion joints 34a, 34b, absorb more heat than expansion joints 34a, 34b, that are light in color, making expansion regions 60a, 60b, of expansion joints 34a, 34b, more likely to buckle and deform than body 32.

It is within the scope of the present invention that any or all of the above-described concepts may be combined. For example, the material used to construct expansion joints 34a, 34b, of walkway pad 30 may be more flexible than the material used to construct body 32 of walkway pad 30, expansion joints 34a, 34b, of walkway pad 30 may be thinner than body 32 of walkway pad 30, and/or expansion joints 34a, 34b, of walkway pad 30 may be dark in color.

Figure 5:
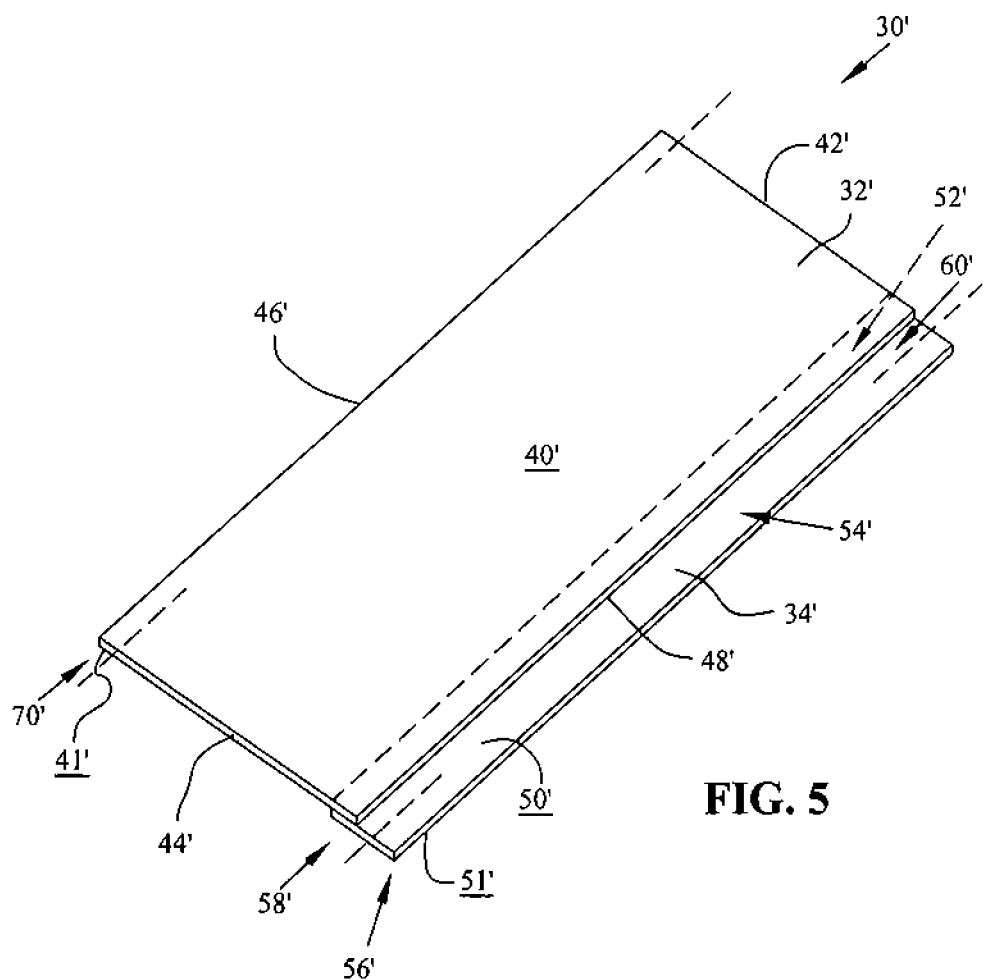
FIG. 5 is a perspective view of another exemplary walkway pad of the present invention, the walkway pad including a body and one expansion joint.

Another exemplary walkway pad 30' is illustrated in FIGS. 5-7. Walkway pad 30' is substantially similar to walkway pad 30 of FIGS. 2-4, with like reference numerals indicating like elements, except as described below. Unlike walkway pad 30, walkway pad 30' includes body 32' and a single expansion joint 34' located beneath body 32'. The use of only one expansion joint 34' may reduce the cost of manufacturing walkway pad 30' compared to walkway pad 30 having two expansion joints 34a, 34b (FIG. 2).

As shown in FIG. 5, body 32' partially overlaps expansion joint 34'. More particularly, second side 48' of body 32' partially overlaps expansion joint 34'. In this partially overlapping arrangement, expansion joint 34' includes first overlapping region 52' where bottom surface 41' of body 32' overlaps top surface 50' of expansion joint 34' and second free region 54' that extends outwardly from body 32' such that bottom surface 41' of body 32' does not overlap top surface 50' of expansion joint 34'.

Referring to FIG. 7, body 32' may be secured to expansion joints 34' by welding, adhering, taping, bonding, or otherwise securing bottom surface 41' of body 32' to top surface 50' of expansion joint 34', and more specifically to overlapping region 52' of top surface 50' of expansion joint 34'. If body 32' is welded to expansion joint 34', the components should be at about the same temperature before welding. Depending on total width $W_2'$ of expansion joint 34', overlapping region 52' may be approximately 1" (2.5 cm), 1.5" (3.8 cm), or 2" (5.1 cm) wide, for example.

Referring still to FIG. 7, walkway pad 30' may be secured to roof 20' by welding, adhering, taping, bonding, or otherwise securing bottom surface 51' of expansion joint 34' to roof 20', and more specifically to membrane 26' of roof 20'. If expansion joint 34' of walkway pad 30' is welded to membrane 26' of roof 20', the components should be at about the same temperature before welding. According to an exemplary embodiment of the present invention, only the outer-most portion of expansion joint 34' is secured to roof 20'. Therefore, as shown in FIG. 7, expansion joint 34' includes outer attachment region 56' where bottom surface 51' is secured to membrane 26' of roof 20', and inner free region 58' where bottom surface 51' is not secured to membrane 26' of roof 20'. Depending on total width $W_2'$ of expansion joint 34', attachment region 56' may be approximately 1" (2.5 cm), 1.5" (3.8 cm), or 2" (5.1 cm) wide, for example.

Additionally, walkway pad 30' may be secured to roof 20' by welding, adhering, taping, bonding, or otherwise securing first side 46' of body 32' to membrane 26' of roof 20'. As shown in FIG. 7, first side 46' of body 32' includes attachment region 70' where bottom surface 41' of body 32' is secured to membrane 26' of roof 20'.

To reduce or eliminate buckling of body 32', expansion joint 34' includes expansion region 60' that is designed to deform to a greater extent than body 32' to absorb thermal movement (expansion/contraction) of body 32'. As a result, body 32' remains flat against roof 20' to provide a flat walking surface and an aesthetically pleasing appearance.

As shown in FIG. 7, expansion region 60' of expansion joint 34' is not directly attached to body 32' or to roof 20'. More specifically, expansion region 60' of expansion joint 34' is offset from both overlapping region 52' of top surface 50' and attachment region 56' of bottom surface 51'. Thus, expansion region 60' of expansion joint 34' is defined where free region 54' of top surface 50' overlaps free region 58' of bottom surface 51'. To account for the presence of only a single expansion joint 34', expansion region 60' of expansion joint 34' may be about twice as wide as each individual expansion region 60a, 60b, when using two expansion joints 34a, 34b (FIGS. 2-5). For example, expansion region 60' of walkway pad 30' may be approximately 2" (5.1 cm), 3" (7.6 cm), or 4" (10.2 cm) wide, while each individual expansion region 60a, 60b, of walkway pad 30 (FIGS. 2-5) may be approximately 1" (2.5 cm), 1.5" (3.8 cm), or 2" (5.1 cm) wide.

To accommodate thermal movement (expansion/contraction) of body 32', the material used to construct expansion joint 34' of walkway pad 30' may be more flexible than the material used to construct body 32' of walkway pad 30', expansion joint 34' may be thinner than body 32' of walkway pad 30', and/or expansion joint 34' may be dark in color.

Figure 8:
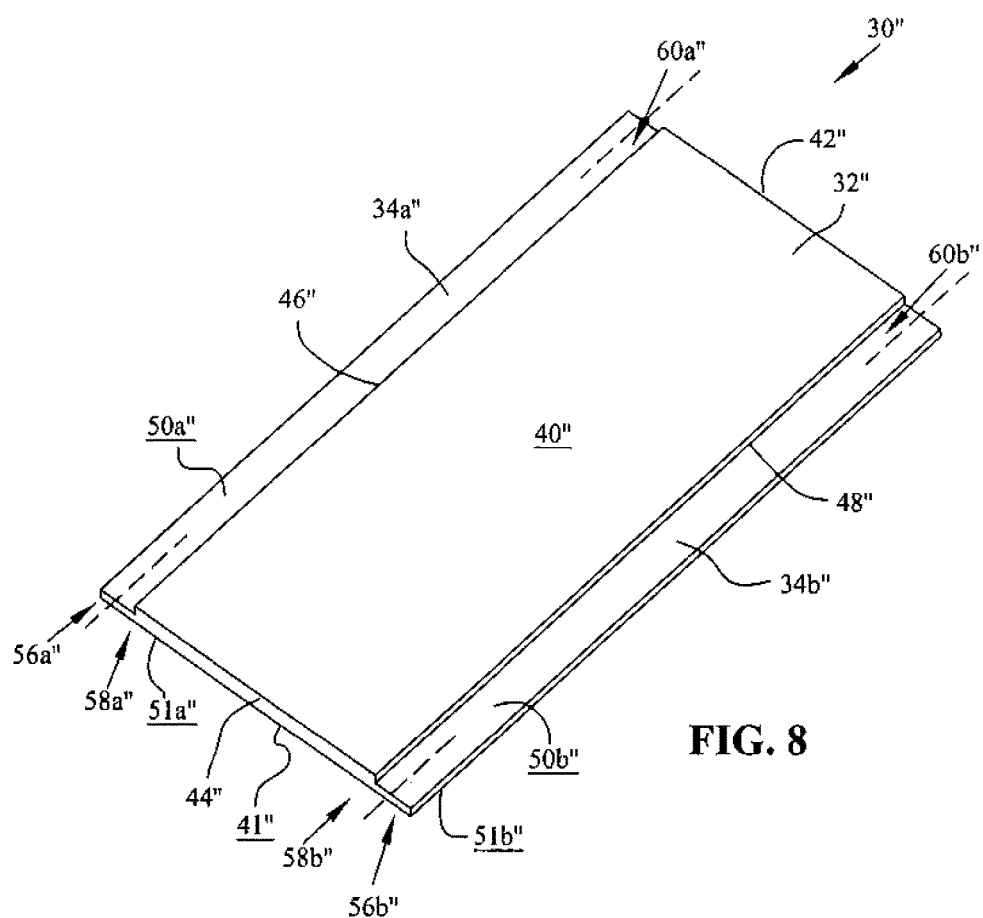
FIG. 8 is a perspective view of yet another exemplary walkway pad of the present invention, the walkway pad including a body and two integral expansion joints.
Figure 9:
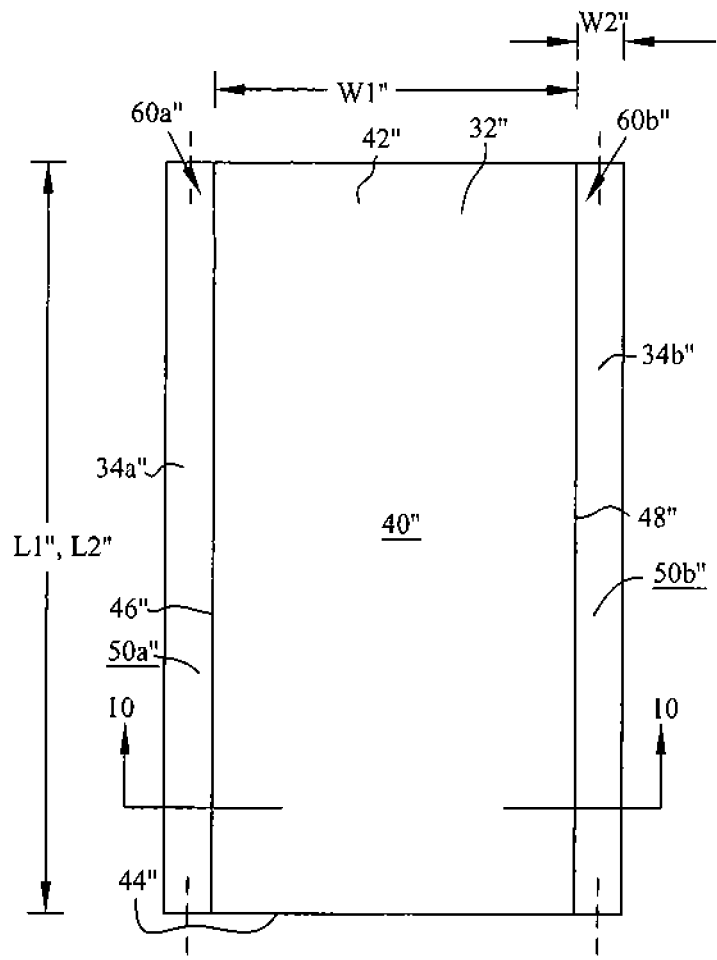
FIG. 9 is a top plan view of the walkway pad of FIG. 8.
Figure 10:
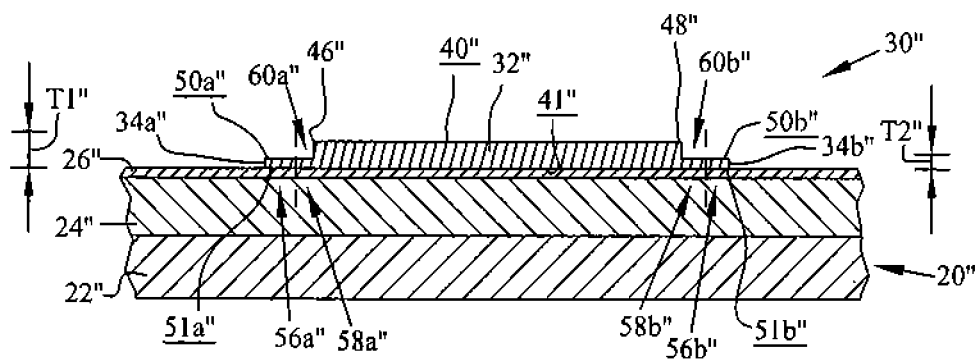
FIG. 10 is a cross-sectional view of the walkway pad of FIG. 9 mounted to a flat roof, the cross-sectional view taken along line 10-10 of FIG. 9.

Another exemplary walkway pad 30" is illustrated in FIGS. 8-10. Walkway pad 30" is substantially similar to walkway pad 30 of FIGS. 2-4 and walkway pad 30' of FIGS. 5-7, with like reference numerals indicating like elements, except as described below. Unlike walkway pad 30 and walkway pad 30', walkway pad 30" is an integral structure, with expansion joints 34a", 34b", being integrally connected to body 32".

As shown in FIG. 8, expansion joints 34a", 34b", extend outwardly from body 32". More particularly, expansion joint 34a" extends outwardly from first side 46" of body 32" and expansion joint 34b" extends outwardly from second side 48" of body 32". Although expansion joints 34a", 34b", are shown extending along first side 46" and second side 48" of body 32", the integral walkway pad 30" may include only a single expansion joint (as in FIGS. 5-7), or the integral walkway pad 30" may include additional expansion joints that extend from first end 42" and/or second end 44" of body 32", for example.

Referring to FIG. 10, walkway pad 30" may be secured to roof 20" by welding, adhering, taping, bonding, or otherwise securing bottom surfaces 51a", 51b", of expansion joints 34a", 34b", to roof 20", and more specifically to membrane 26" of roof 20". If expansion joints 34a", 34b", of walkway pad 30" are welded to membrane 26" of roof 20", the components should be at about the same temperature before welding. According to an exemplary embodiment of the present invention, only the outer-most portion of each expansion joint 34a", 34b", is secured to roof 20". Therefore, as shown in FIG. 10, each expansion joint 34a", 34b", includes outer attachment region 56a", 56b", where bottom surface 51a", 51b", is secured to membrane 26" of roof 20", and inner free region 58a", 58b", where bottom surface 51a", 51b", is not secured to membrane 26" of roof 20". Depending on total width $W_2$" of each expansion joint 34a", 34b", each attachment region 56a", 56b", may be approximately 1" (2.5 cm), 1.5" (3.8 cm), or 2" (5.1 cm) wide, for example. In this embodiment, bottom surface 41" of body 32" may rest directly against roof 20" rather than hovering slightly above roof 20".

To reduce or eliminate buckling of body 32", each expansion joint 34a", 34b", includes a corresponding expansion region 60a", 60b", that is designed to deform to a greater extent than body 32" to absorb thermal movement (expansion/contraction) of body 32". As a result, body 32" remains flat against roof 20" to provide a flat walking surface and an aesthetically pleasing appearance.

As shown in FIG. 10, expansion regions 60a", 60b", of expansion joints 34a", 34b", are not directly attached to body 32" or to roof 20". More specifically, expansion regions 60a", 60b", of expansion joints 34a", 34b", are offset from body 32" and from attachment regions 56a", 56b", of bottom surfaces 51a", 51b". Thus, expansion regions 60a", 60b", of expansion joints 34a", 34b", include free regions 58a", 58b", of bottom surfaces 51a", 51b". Each expansion region 60a", 60b", may be approximately 1" (2.5 cm), 1.5" (3.8 cm), or 2" (5.1 cm) wide, for example.

In this embodiment, the material used to construct expansion joints 34a", 34b", of walkway pad 30" may be the same as the material used to construct body 32" of walkway pad 30". However, expansion regions 60a", 60b", of expansion joints 34a", 34b", may still accommodate thermal movement (expansion/contraction) of body 32" by providing expansion joints 34a", 34b", that are thinner than body 32" of walkway pad 30" and/or dark in color.

Figure 11:
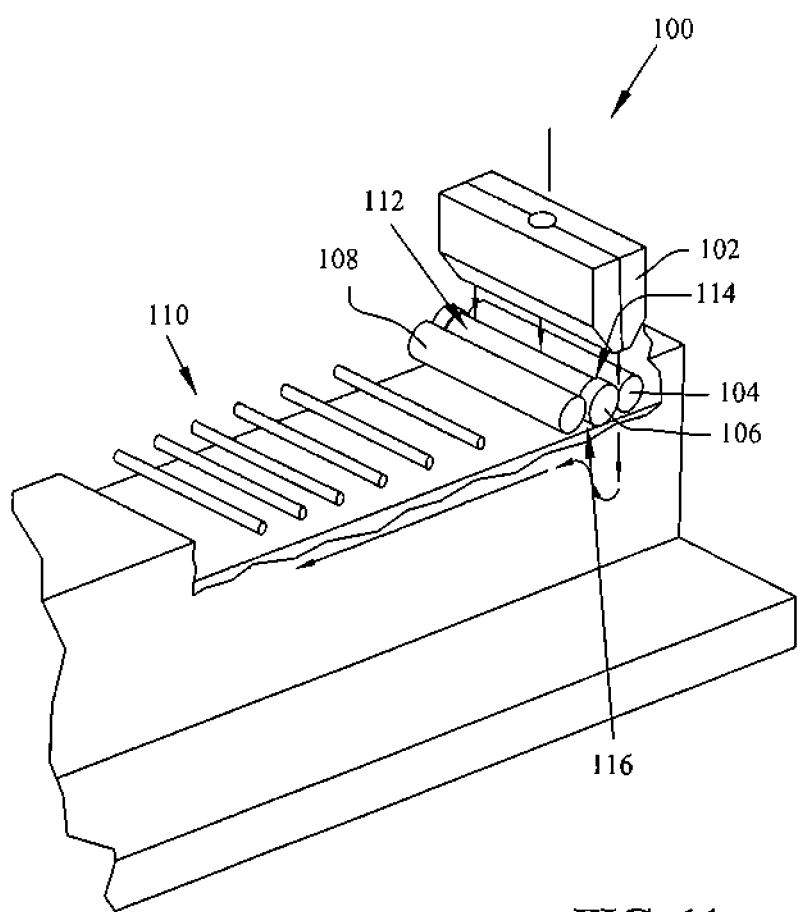
FIG. 11 is a perspective view of an exemplary machine of the present invention, the machine including a plurality of calendars.
Figure 12:
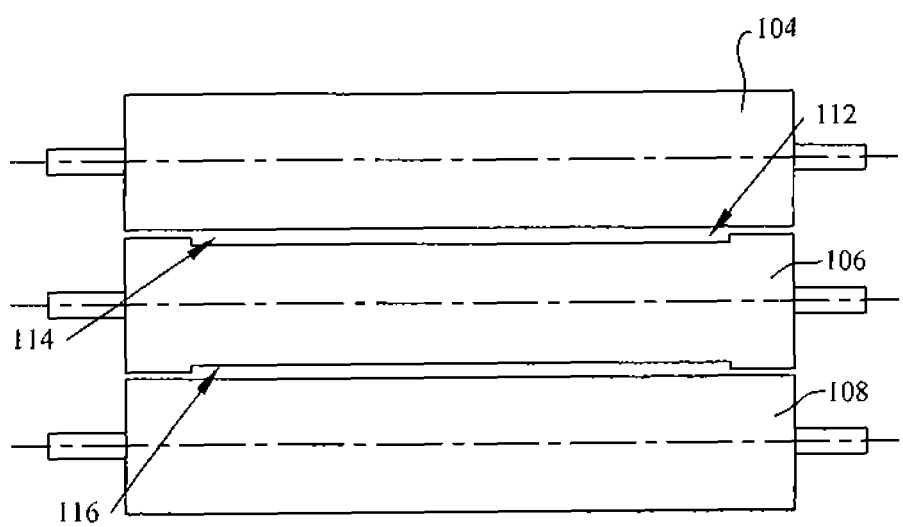
FIG. 12 is a top plan view of the plurality of calendars of FIG. 11.

Referring to FIGS. 11-12, exemplary machine 100 is provided for manufacturing the integral walkway pad 30" of FIGS. 8-10. Machine 100 includes die 102, first cylindrical calendar 104, second cylindrical calendar 106, third cylindrical calendar 108, and conveyor 110. As shown in FIG. 12, second calendar 106 includes an annular recess 112 in its outer surface. Second calendar 106 cooperates with first calendar 104 to define a T-shaped gap 114 therebetween, and second calendar 106 cooperates with third calendar 108 to define a substantially identical T-shaped gap 116 therebetween.

In operation, a melted material, such as a melted blend of rubber and thermoplastic polyolefin (RPO), exits die 102 and flows downwardly through gap 114 between first calendar 104 and second calendar 106. Then, the material flows around second calendar 106 and upwardly through gap 116 between second calendar 106 and third calendar 108. Finally, the material flows around third calendar 108 and along conveyor 110 and is cut to a desired length $L_1$", $L_2$" (FIG. 9). The resulting product that exits machine 100 is T-shaped in cross-section, like gaps 114, 116.

EXAMPLES

1. Use of Expansion Joints

Three walkway pads were constructed to examine the performance of expansion joints of embodiments of the present invention. The bodies of all three walkway pads were identical. Each body was a rectangular TPO Eco Walkway Pad available from Firestone Building Products Company of Indianapolis, Ind. Each body had a thickness of 140 mils (3.6 mm).

The first walkway pad included two expansion joints secured beneath the body, like walkway pad 30 of FIGS. 2-4. Each expansion joint was an elongate strip of rubber and thermoplastic polyolefin (RPO) having a thickness of 38 mils (1.0 mm). The expansion joints were black in color. Also, the expansion region of each expansion joint was 1.5" wide (3.8 cm).

The second walkway pad included two expansion joints secured beneath the body, like walkway pad 30 of FIGS. 2-4. Each expansion joint was an elongate strip of rubber and thermoplastic polyolefin (RPO) having a thickness of 38 mils (1.0 mm). The expansion joints were gray in color. Also, the expansion region of each expansion joint was 1.5" wide (3.8 cm).

The third walkway pad was a control sample that did not include an expansion joint. Rather, the body of the third walkway pad was attached directly to a roof membrane.

The three walkway pads were secured to a roof membrane and placed outdoors in sunlight for 6 hours and 23 minutes.

At the start of the test, the ambient temperature was 67° F. At the end of the test, the ambient temperature had increased to 93° F.

After the test, the bodies of the first and second walkway pads lacked any visible buckling. Buckling was only observed on the expansion joints of the first and second walkway pads. The body of the third walkway pad, however, included visible crests at both ends, including one crest that was about 1.19" (3.0 cm) tall.

Also, the temperature of the black expansion joint of the first walkway pad was measured using an infrared thermometer to be about 5° warmer than the gray expansion joint of the second walkway pad.

The test was repeated a second time. The first and second walkway pads were placed outdoors in sunlight for 4 hours and 25 minutes. Again, the bodies of the first and second walkway pads lacked any visible buckling.

2. Material, Thickness, and Color of Expansion Joints

Another walkway pad was constructed having expansion joints that differed in material, thickness, and color from those of Example 1. The body of the walkway pad was the same as Example 1—a rectangular TPO Eco Walkway Pad available from Firestone Building Products Company of Indianapolis, Ind., having a thickness of 140 mils (3.6 mm).

The walkway pad included two expansion joints secured beneath the body, like walkway pad 30 of FIGS. 2-4. Each expansion joint was an elongate strip of unsupported TPO having a thickness of 60 mils (1.5 mm)—about twice as thick as the expansion joints of Example 1. Also, the expansion region of each expansion joint was 3" (7.6 cm) wide—twice as wide as the expansion regions of Example 1.

A first expansion joint was secured beneath a first side of the body. The first expansion joint was painted black in color near a first end of the body and gray in color near a second end of the body. A second expansion joint was secured beneath a second side of the body. The second expansion joint was left white in color.

The walkway pad was secured to a roof membrane and placed outdoors in sunlight for 4 hours and 35 minutes. At the start of the test, the ambient temperature was 72° F. At the end of the test, the ambient temperature had increased to 85° F.

After the test, the body included a very slight crest near the white expansion joint, but not near the black/gray expansion joint. Measurable buckling was observed on the expansion joints themselves. Crests on the black/gray expansion joint grew by about 0.38" (9.7 mm)-0.63" (16.0 mm), while crests on the white expansion joint grew by about 0.06" (1.5 mm)-0.13" (3.3 mm).

3. Number of Expansion Joints

Another walkway pad was constructed having only a single expansion joint, like walkway pad 30' of FIGS. 5-7. The body of the walkway pad was the same as Examples 1 and 2—a rectangular TPO Eco Walkway Pad available from Firestone Building Products Company of Indianapolis, Ind., having a thickness of 140 mils (3.6 mm).

Like Example 1, the expansion joint was an elongate strip of rubber and thermoplastic polyolefin (RPO) having a thickness of 38 mils (1.0 mm). However, unlike Example 1, the expansion region of the single expansion joint was 3" (7.6 cm) wide.

The expansion joint and the opposite side of the body were secured to a roof membrane. The walkway pad was then placed outdoors in sunlight for 4 hours and 35 minutes. At the start of the test, the ambient temperature was 72° F. At the end of the test, the ambient temperature had increased to 85° F.

After the test, the body of the walkway pad included small visible crests at both ends, including one crest that grew from about 0" (0 mm) tall to about 0.06" (1.5 mm) tall and another crest that grew from about 0"(0 mm) tall to about 0.13" (3.3 mm) tall. The expansion joint itself included crests that grew from about 0.25" (6.4 mm) tall to about 0.69" (17.5 mm) tall.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A walkway pad for protecting a roof, the walkway pad comprising:
   a body including a top walkway surface and a bottom surface that faces the roof; and
   at least one expansion joint including a first attachment region coupled to said body, a second attachment region adapted to couple the walkway pad to the roof, and a third expansion region located between said first and second attachment regions that is free to move relative to said body and the roof to absorb thermal movement of said body, where said expansion joint is constructed of a thermoplastic polyolefin.

2. The walkway pad of claim 1, wherein said at least one expansion joint is more flexible than said body.

3. The walkway pad of claim 1, wherein said at least one expansion joint is thinner than said body.

4. The walkway pad of claim 1, wherein said at least one expansion joint is one of black and gray in color.

5. The walkway pad of claim 1, wherein said body includes an outer periphery, said third expansion region of said at least one expansion joint being located outwardly beyond said outer periphery of said body.

6. The walkway pad of claim 1, wherein said at least one expansion joint extends from a first side of said body and a second expansion joint extends from a second side of said body opposite said first side, wherein an air gap is present between the expansion joints.

7. The walkway pad of claim 1, wherein said first attachment region of said at least one expansion joint is integrally coupled to said body.

8. The walkway pad of claim 1, wherein said second attachment region of said at least one expansion joint is adapted to be welded to the roof.

9. A walkway pad for protecting a roof, the walkway pad comprising:
   a body including a top walkway surface, a bottom surface that faces the roof, and an outer periphery, where the body includes a supported thermoplastic polyolefin; and
   at least one expansion joint coupled to said body, said expansion joint extending outwardly beyond said outer periphery of said body, said at least one expansion joint including an expansion region that is configured to deform to a greater extent than said body when the walkway pad is exposed to a changing temperature, and said expansion joint being constructed of a thermoplastic polyolefin.

10. The walkway pad of claim 9, wherein said at least one expansion joint is more flexible than said body.

11. The walkway pad of claim 9, wherein said at least one expansion joint is thinner than said body.

12. The walkway pad of claim 11, wherein said body is at least twice as thick as said at least one expansion joint.

13. The walkway pad of claim 9, wherein said expansion region is darker in color than said body.

14. The walkway pad of claim 9, wherein said at least one expansion joint includes an attachment region for attaching the walkway pad to the roof, said expansion region being located between said outer periphery of said body and said attachment region.

15. The walkway pad of claim 9, wherein said at least one expansion joint extends from a first side of said body and a second expansion joint extends from a second side of said body opposite said first side, wherein an air gap is present between the expansion joints.

16. The walkway pad of claim 9, wherein said at least one expansion joint is integrally formed as one unit with said body.

17. A method of manufacturing a walkway pad for protecting a roof, the method comprising the steps of:

providing a body including a top walkway surface, a bottom surface, and an outer periphery; and forming at least one thermoplastic expansion joint that extends beyond said outer periphery of said body, said at least one expansion joint including a first attachment region coupled to said body, a second attachment region adapted to couple the walkway pad to the roof, and a third expansion region located between said first and second attachment regions that is configured to deform to a greater extent than said body when the walkway pad is exposed to a changing temperature.

18. The method of claim 17, wherein said providing step and said forming step are performed simultaneously by injecting a melted material into a mold.

19. The method of claim 17, wherein said forming step comprises welding said first attachment region of said at least one expansion joint to said body.

20. The method of claim 17, further comprising a step of painting said third expansion region of said at least one expansion joint.

\* \* \* \* \*